United States Patent
Chen

(10) Patent No.: US 9,759,882 B2
(45) Date of Patent: Sep. 12, 2017

(54) LARGE MATRIX VCSEL TERMINATION WITHOUT CHANNEL LASER CROSSTALK

(71) Applicant: Verizon Patent and Licensing Inc., Arlington, VA (US)

(72) Inventor: David Z. Chen, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/823,096

(22) Filed: Aug. 11, 2015

(65) Prior Publication Data
US 2017/0045698 A1   Feb. 16, 2017

(51) Int. Cl.
*G02B 6/42* (2006.01)
*G02B 6/38* (2006.01)

(52) U.S. Cl.
CPC ......... *G02B 6/4292* (2013.01); *G02B 6/3826* (2013.01); *G02B 6/3855* (2013.01); *G02B 6/423* (2013.01)

(58) Field of Classification Search
USPC .............................................. 385/52, 115, 14
See application file for complete search history.

(56) References Cited

U.S. PATENT DOCUMENTS

| | | | | |
|---|---|---|---|---|
| 2004/0042732 A1* | 3/2004 | Bruns | ................... | G02B 6/3833 385/71 |
| 2013/0163930 A1* | 6/2013 | Jian | .......................... | G02B 6/36 385/60 |
| 2013/0294725 A1* | 11/2013 | Levy | .................... | G02B 6/3829 385/33 |
| 2014/0161396 A1* | 6/2014 | Feng | .................... | G02B 6/4243 385/83 |

* cited by examiner

*Primary Examiner* — Eric Wong

(57) ABSTRACT

A termination ferrule includes a ferrule body and a ferrule plate. The ferrule body includes multiple bores arranged to align with a pattern of lasers in a vertical-cavity surface-emitting laser (VCSEL) array. Each of the multiple bores includes an entry diameter sized for an optical fiber with a protective coating and an exit diameter sized for a portion of the optical fiber without the protective coating. The ferrule plate includes multiple holes arranged to align with the pattern of lasers in the VCSEL array. Each of the multiple holes includes a hole diameter sized to receive the portion of the optical fiber without the protective coating. The ferrule plate is secured between the VCSEL array and the ferrule body, and the ferrule plate includes a thickness sufficient to create a gap between each laser in the VCSEL array and the corresponding optical fiber.

18 Claims, 9 Drawing Sheets

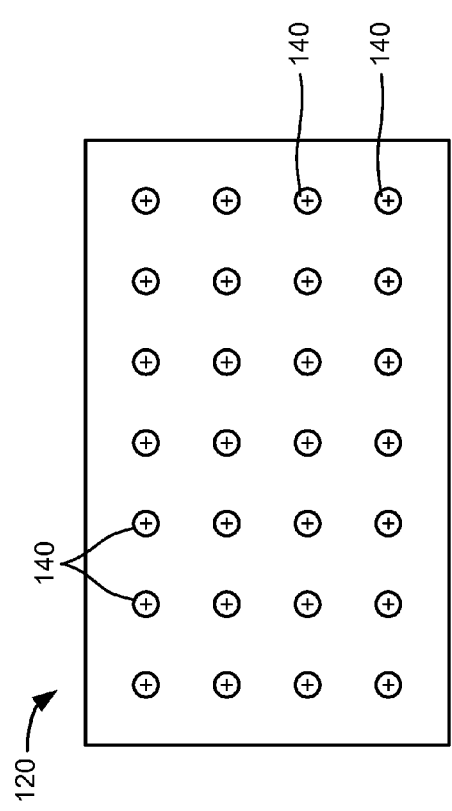
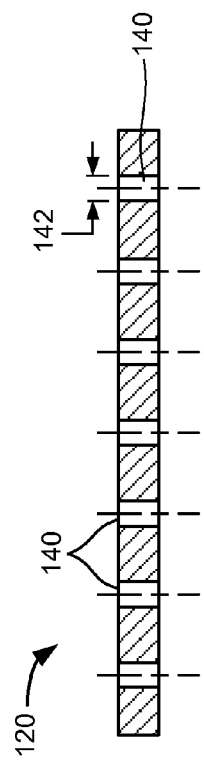
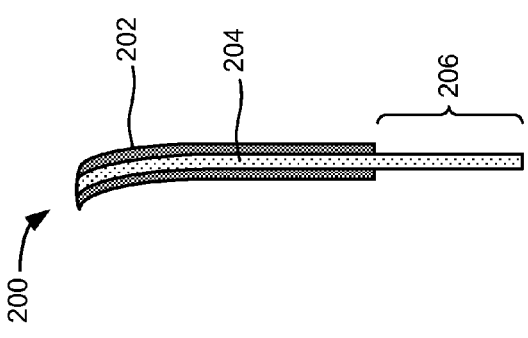
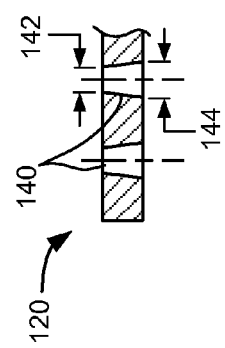

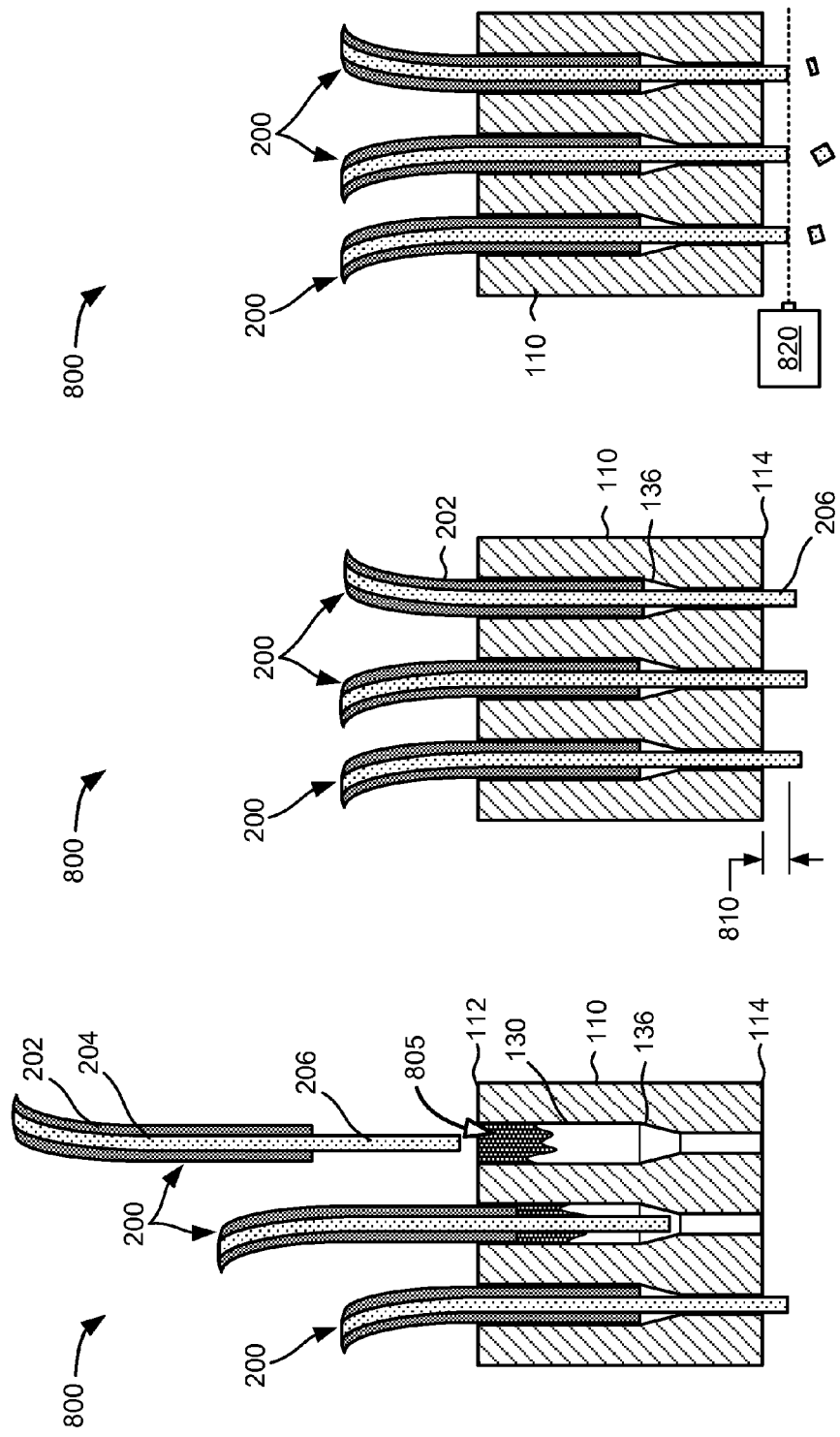

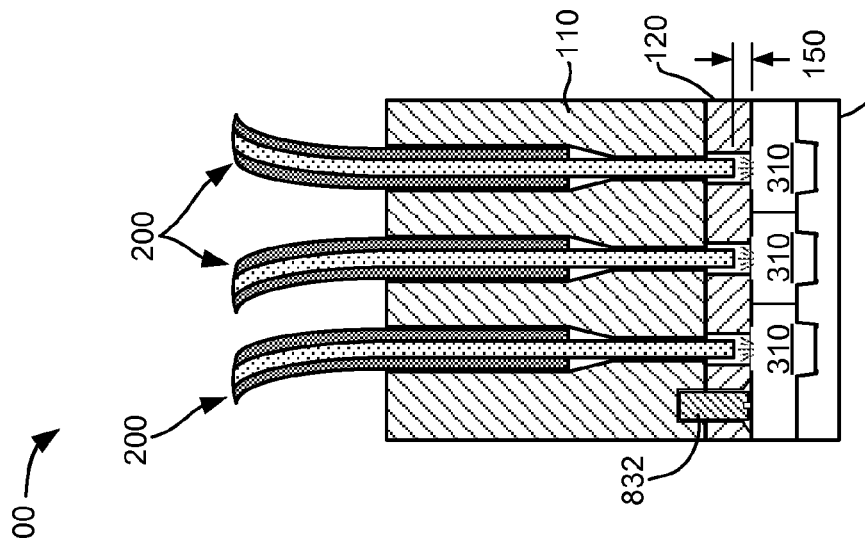
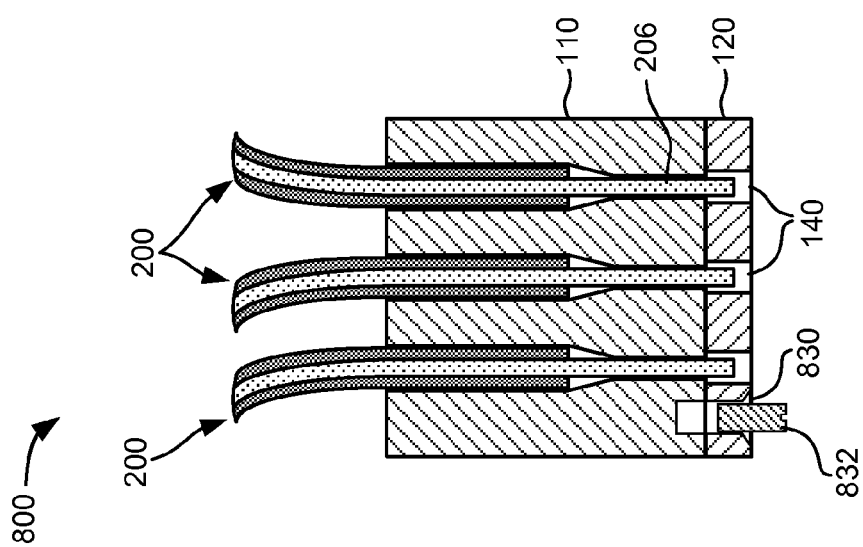
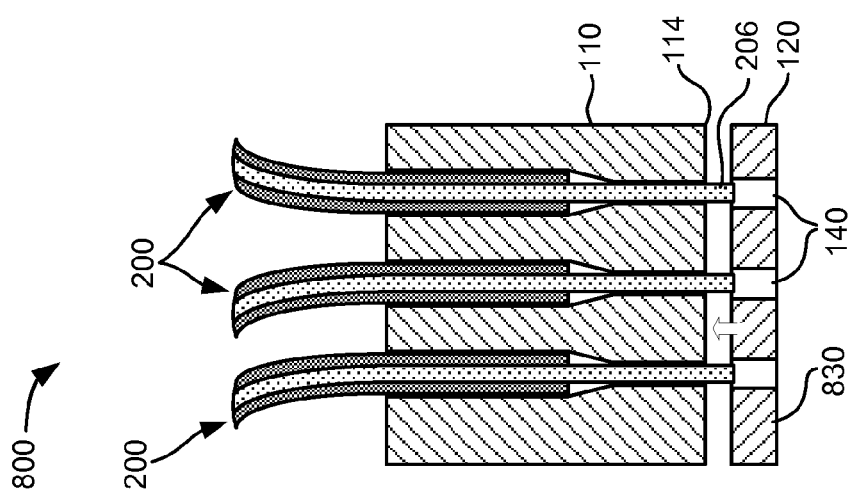

LARGE MATRIX VCSEL TERMINATION WITHOUT CHANNEL LASER CROSSTALK

BACKGROUND

A vertical-cavity surface-emitting laser (VCSEL) is a semiconductor-based laser diode that emits an optical beam vertically from its top surface. Because VCSELs emit light perpendicular to the surface of a chip, a large number of VCSELs can be mounted on a single chip. In some instances, VCSELs can be implemented in a two-dimensional array, enabling a single die to comprise hundreds of individual light sources. These arrays can be customized to scale power output to optimally meet application requirements using a single optical driver and drive current. In the telecommunications industry, the VCSEL's uniform, single-mode beam profile is desirable for coupling to optical fibers, where each laser in the VCSEL array can provide a different communication channel.

BRIEF DESCRIPTION OF THE DRAWINGS

FIG. 3 is a schematic side cross-sectional view of an optical fiber of FIGS. 1 and 2;

FIGS. 5A and 5B are schematic top and side cross-sectional views, respectively, of a ferrule plate of the termination ferrule of FIGS. 1 and 2;

FIG. 5C is a schematic cross-sectional view of a portion of a ferrule plate in an alternate implementation;

FIGS. 8A-8F are schematic side cross-sectional views of a fiber termination assembly during the process of FIG. 7.

DETAILED DESCRIPTION OF PREFERRED EMBODIMENTS

The following detailed description refers to the accompanying drawings. The same reference numbers in different drawings may identify the same or similar elements.

Systems and methods described herein provide for terminating optical fibers to individual lasers in a vertical-cavity surface-emitting laser (VCSEL) array. A VCSEL array may include multiple lasers (e.g., ranging from a few lasers to a few thousand lasers) on a single semiconductor. It is desirable to couple each laser in the VCSEL array to an optical fiber for distributing communication signals. However, coupling an optical fiber to a laser in the compact space of the VCSEL array presents challenges. Particularly, imperfections in the light distribution pattern of each laser can result in a conical or oval light beam being emitted from the laser. These imperfections can cause inter-laser interference (or crosstalk) among the lasers in the VCSEL array. To direct the conical/oval beam into an optical fiber with a circular cross section, one or more lenses may be used to reshape each VCSEL laser beam. However, the use of additional lenses and their fine tuning can be time consuming and expensive. Furthermore, use of such lenses provides a relatively low yield of light transferred into a corresponding optical fiber. Thus, a more efficient system for terminating a large number of optical fibers for a VCSEL array is needed.

According to an implementation described herein, a termination ferrule, with optical fibers mounted therein, is affixed to a VCSEL array. The termination ferrule includes a ferrule body and a ferrule plate. Both of the ferrule body and the ferrule plate include a set of multiple bores or holes that are configured to align with lasers (in a pattern) in the VCSEL array. Optical fibers are secured within each bore of the ferrule body such that, for each fiber, a portion of bare fiber extends past an end of its respective bore. With all of the optical fibers installed, the ends of the bare fibers can be cleaved and/or polished. The ferrule plate is attached to the ferrule body so that, for each fiber, a bare fiber extends partially into each highly polished hole of the ferrule plate. The termination ferrule with the installed optical fibers is mounted to the surface of the VCSEL array, aligning the holes of the ferrule plate with the lasers in the VCSEL array.

Figure 1:
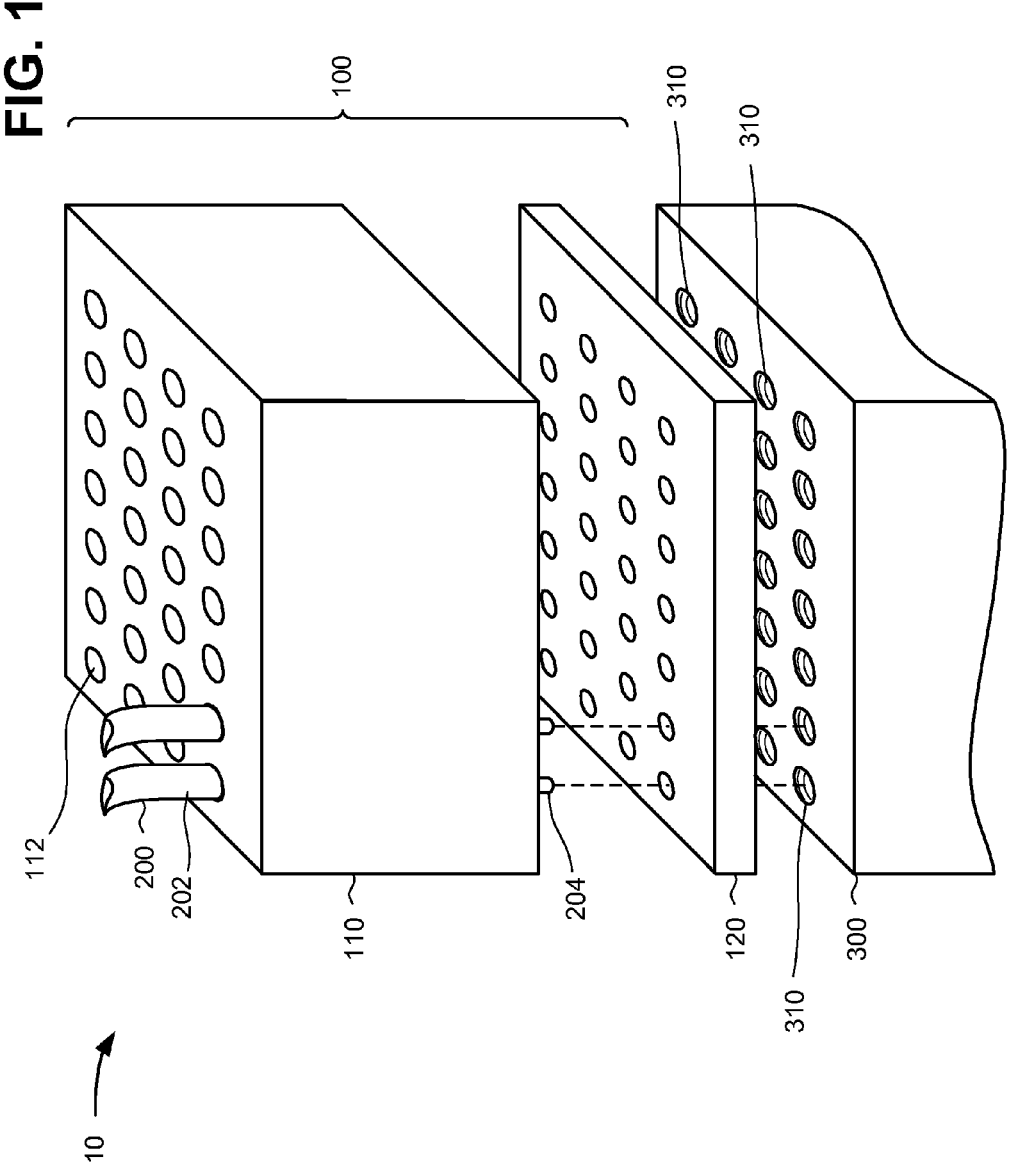
FIG. 1 is a schematic assembly view of a fiber termination assembly for a VCSEL array according to an implementation described herein.
Figure 2:
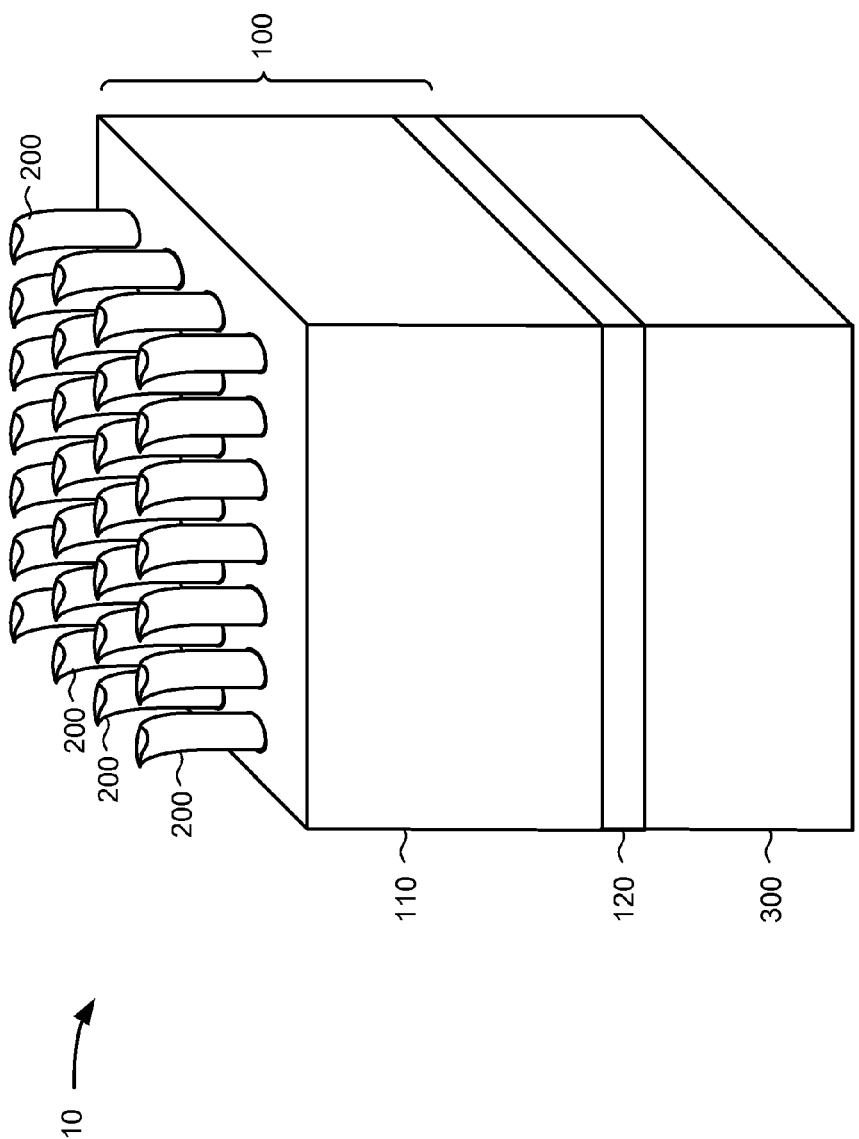
FIG. 2 is a schematic isometric view of the fiber termination assembly of FIG. 1 with all optical fibers installed.

FIG. 1 provides a schematic assembly view of a fiber termination assembly 10 for a VCSEL array according to an implementation described herein. FIG. 2 provides a schematic isometric view of fiber termination assembly 10 with a complete set of optical fibers installed. As shown in FIGS. 1 and 2, fiber termination assembly 10 may include a termination ferrule 100, optical fibers 200, and a VCSEL array 300. Termination ferrule 100 may connect optical fibers 200 to VCSEL array 300. As described further herein, optical fibers 200 are secured within termination ferrule 100, which is then secured to VCSEL array 300 such that each of optical fibers 200 is aligned with a corresponding laser of VCSEL array 300.

VCSEL array 300 may include a two-dimensional array of VCSEL lasers 310. The number and pattern of VCSEL lasers 310 in VCSEL array 300 is for illustration. VCSEL array 300 may include more or fewer VCSEL lasers 310 in different arrangements. In fact, there may be hundreds or thousands of VCSEL lasers 310 in a single VCSEL array 300. Each VCSEL laser 310 includes a laser diode with a monolithic laser resonator, where emitted light leaves laser 310 in a direction perpendicular to the chip surface (e.g., upwards from VCSEL array 300 into termination ferrule 100 in the configuration of FIGS. 1 and 2). Each laser resonator of laser 310 includes an active region of quantum wells (i.e., thin layers confining carriers in one direction) between an upper semiconductor Bragg mirror and a lower semiconductor Bragg mirror. A heat sink, typically copper, forms a bottom layer of the VCSEL array.

Optical fibers 200 may include fibers for communication networks such as ten Gigabyte Ethernet (GbE) networks or 40 GbE networks. FIG. 3 is a schematic side cross-sectional view of an optical fiber 200. Referring collectively to FIGS. 1-3, optical fiber 200 may generally include a protective coating 202 or buffer surrounding silica cladding and core portions. The cladding and core portions are referred to herein collectively as bare fiber 204 (e.g., a single mode or multimode optical fiber with a combination of core and cladding). Optical fiber 200 may include standard diameter fibers or non-standard diameter fibers. In an exemplary implementation, each optical fiber 200 may have a coating 202 diameter of about 250 microns and a bare fiber diameter of 125 microns. In systems and methods described herein, optical fibers 200 have protective coating 202 removed (e.g., stripped) from an end of optical fiber 200, to expose a span 206 of bare fiber 204, prior to optical fibers 200 being used with fiber termination assembly 10.

Figure 4B:
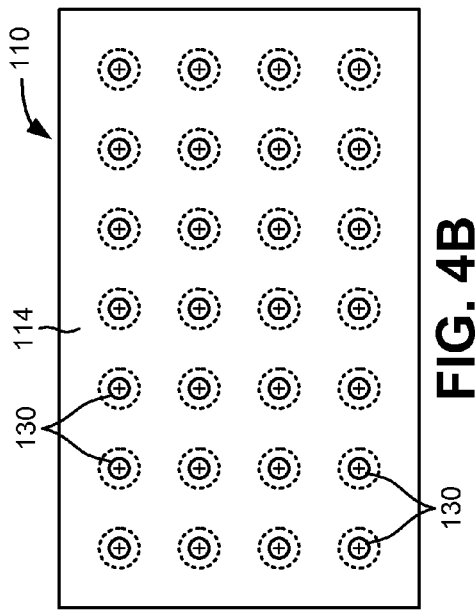
FIGS. 4A-4C are schematic top, bottom, and side cross-sectional views, respectively, of a ferrule body of the termination ferrule of FIGS. 1 and 2.
Figure 4A:
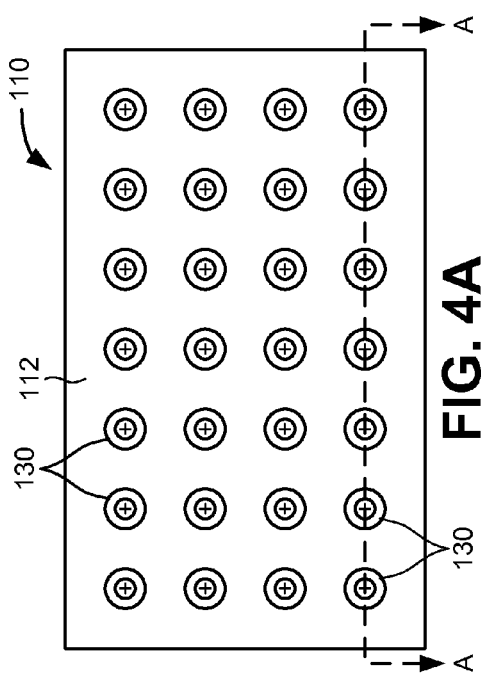
Figure 4C:
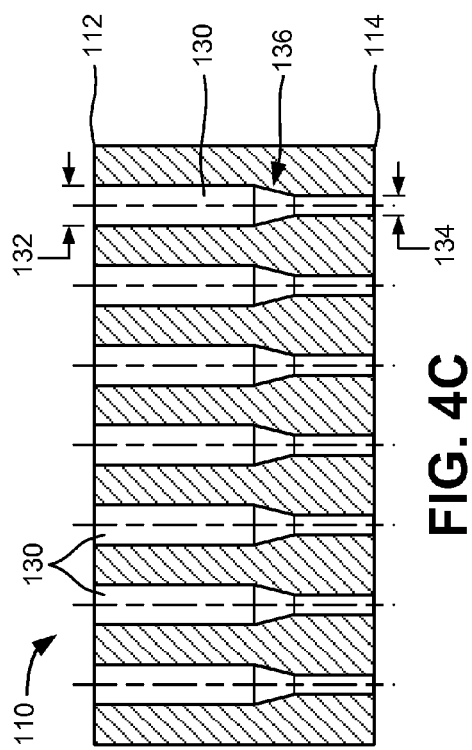

Termination ferrule 100 may include a ferrule body 110 and a ferrule plate 120. FIGS. 4A and 4B are schematic top and bottom views, respectively, of ferrule body 110. FIG. 4C is a side cross-sectional view of ferrule body 110 along section A-A of FIG. 4A. Referring collectively to FIGS. 1-4C, ferrule body 110 may include multiple bores 130, each configured to receive an optical fiber 200. In one implementation, the number and patterns of bores 130 may correspond to the number and pattern of lasers 310 in VCSEL array 300, such that each of bores 130 aligns with a VCSEL laser 310 when fiber termination assembly 10 is pieced together.

Ferrule body 110 may be a relatively rigid component that is resistant to thermal expansion and vibration. Ferrule body 110 may also include a material with good heat transfer properties. For example, ferrule body 110 may be made from a ceramic or titanium material. Ferrule body 110 may include a fiber insertion end 112 and a fiber alignment end 114. Bores 130 may extend though body 110 from insertion end 112 to fiber alignment end 114. In one implementation, one or more surfaces of bore 130 may be lined with metal or a coating.

Each of bores 130 may include an entry diameter 132 and an exit diameter 134 joined at a shoulder portion (or step) 136. Entry diameter 132 may generally be sized to receive optical fibers 200 with protective coating 202. For example, for a standard diameter optical fiber of 250 microns, entry diameter 132 may be nominally larger than 250 microns to provide minimal clearance and room for adhesives. Exit diameter 134 may generally be sized to receive a portion of optical fiber 200 without protective coating 202 (i.e., only bare fiber 204). For example, for a standard diameter bare fiber of 125 microns, exit diameter 134 may be nominally larger than 125 microns to provide minimal clearance and room for adhesives. Shoulder portion 136 may provide a transition between entry diameter 132 and exit diameter 134 within bore 130 as well as a stopping point for insertion of the portion of optical fiber 200 with protective coating 202.

As noted above, each optical fiber 200 may be prepared such that protective coating 202 is removed (e.g., stripped) from an end of optical fiber 200 to expose span 206 of bare fiber 204. For example, any protective coating 202 around the end portion of optical fiber 200 (e.g., span 206) that is to be used with ferrule body 110 may be removed via mechanical tools or via chemical-based and/or hot air-based stripping processes. In one implementation, stripping may include removing a cable sheath and buffer tubes from optical fiber 200 and cleaning any gel from the bare fiber 204. Span 206 of bare fiber 204 may be sufficiently long to extend from shoulder portion 136 past fiber alignment end 114. Generally, ferrule body 110 may be configured to permit optical fibers 200 to be inserted (e.g., pushed) into bores 130 at fiber insertion end 112. Each optical fiber 200 may be guided through a bore 130 so that, when protective coating 202 abuts shoulder portion 136, a portion of bare fiber 204 extends past fiber alignment end 114, as shown, for example, in FIG. 1.

FIGS. 5A and 5B are schematic top and side cross-sectional views, respectively, of ferrule plate 120. Like ferrule body 110, ferrule plate 120 may be a relatively rigid component that is resistant to thermal expansion and vibration. Ferrule plate 120 may also include a material with good heat transfer properties. For example, ferrule plate 120 may be made from a ceramic or titanium material. However, ferrule body 110 and ferrule plate 120 need not be made from the same material.

Referring collectively to FIGS. 1-5B, ferrule plate 120 may include multiple holes 140, each configured to receive a bare fiber 204 of optical fiber 200. In one implementation, the number and pattern of holes 140 may correspond to the number and pattern of lasers 310 in VCSEL array 300 and/or the same number and pattern of bores 130 in ferrule body 110. In one implementation, each VCSEL laser 310 is aligned with a bore 130 and a hole 140 along a common axis when fiber terminal assembly 10 is assembled. Thus, each of holes 140 may be positioned between and axially aligned with a VCSEL laser 310 and a bore 130 when fiber termination assembly 10 is pieced together. The surface of holes 140 may be polished.

Each of holes 140 may include a diameter 142. Diameter 142 may generally be sized so that each hole receives a portion of optical fiber 200 without protective coating 202 (i.e., only bare fiber 204). In one implementation, diameter 142 may be larger than diameter 134 of bore 130 and smaller than a diameter 312 of a VCSEL laser 310 (see FIG. 6C) to allow for easier simultaneous alignment of multiple holes 140 with bores 130. In another implementation, diameter 142 may be identical to diameter 134 of bore 130. For example, for a standard diameter bare fiber of 125 microns, exit diameter 142 may be nominally larger than 125 microns to provide minimal clearance.

FIG. 5C is a schematic cross-sectional view of a portion of ferrule plate 120 in an alternate implementation. In another implementation, each of holes 140 may include a conical shape such that diameter 142 may represent a minimum diameter at one end of hole 140 (e.g., an end installed adjacent to ferrule body 110) with a larger diameter 144 at an opposite end of hole 140 (e.g., an end installed adjacent to VCSEL array 300).

Figure 6A:
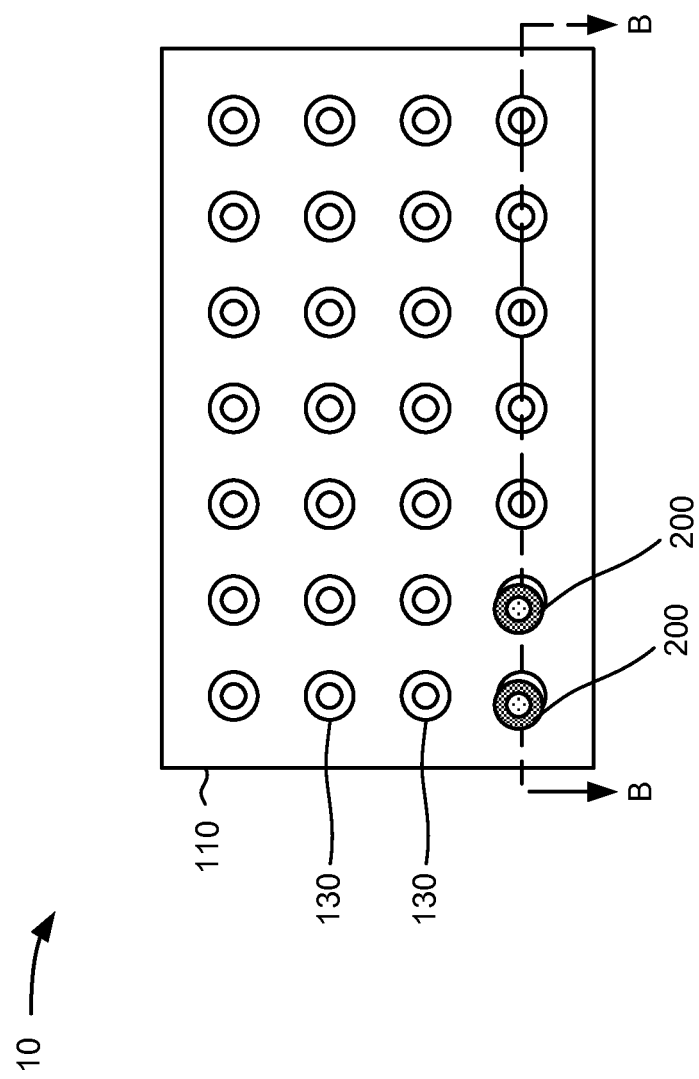
FIGS. 6A and 6B are schematic top and side cross-sectional views, respectively, of the fiber termination assembly of FIG. 1.
Figure 6C:
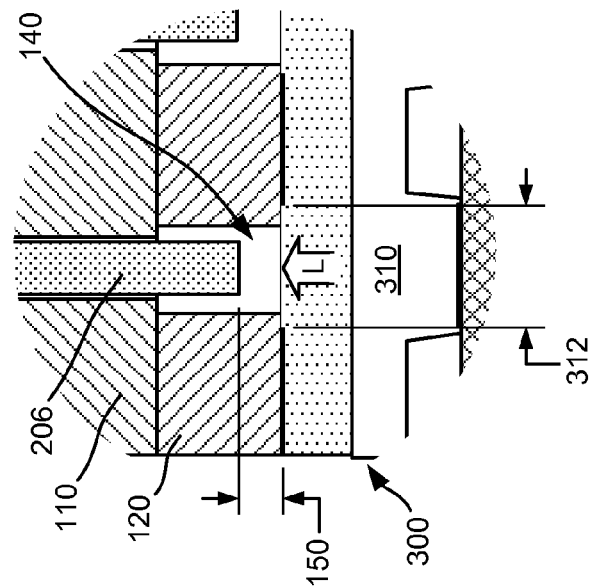
FIG. 6C is an enlarged view of a portion of the side cross-sectional view of FIG. 6A.
Figure 6B:
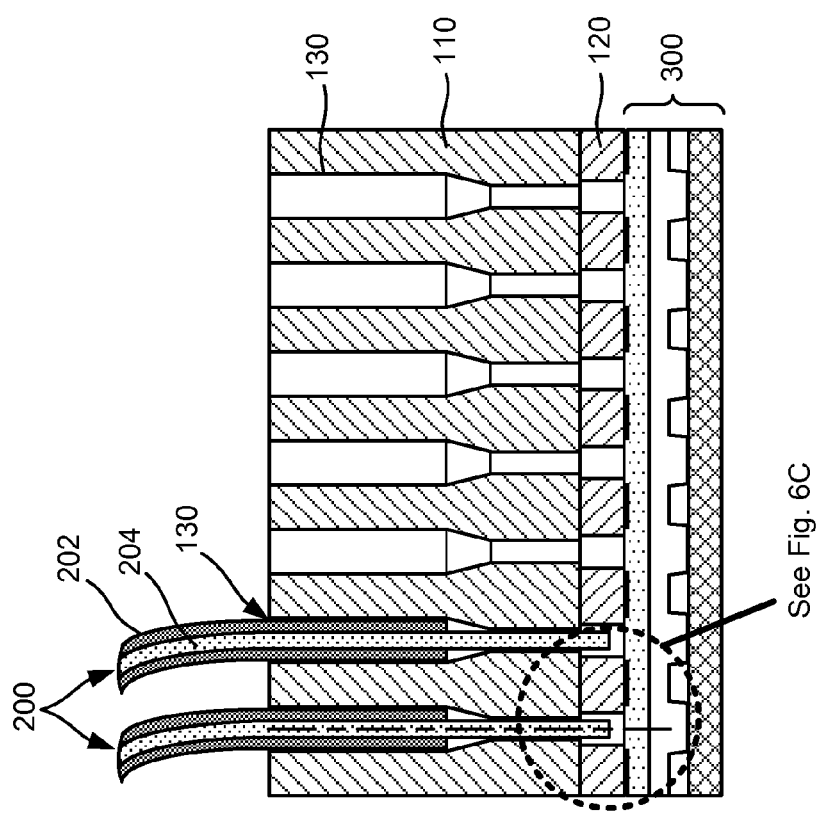

FIG. 6A provides a schematic top view of fiber termination assembly 10 with two optical fibers 200 installed. FIG. 6B is a schematic side cross-sectional view of fiber termination assembly 10 along section B-B of FIG. 6A. FIG. 6C shows an enlarged portion of one of the installed bare fibers of FIG. 6B. Referring collectively to FIGS. 1-6C, when termination ferrule 100 is assembled with optical fibers 200 extending through bores 130 of ferrule body 110, an exposed end of optical fiber 200 at span 206 extends part way through hole 140 of ferrule plate 120. Ferrule plate 120 may be placed in contact with the surface of VCSEL array 300 generally, and particularly so that each hole 140 aligns with the light output ("L") of each VCSEL laser 310. Ferrule plate 120 isolates the light from each VCSEL laser 310 and prevents crosstalk between VCSEL lasers 310 within VCSEL array 300. Ferrule plate 120 may be used to create an appropriate air gap 150 between each VCSEL laser 310 and the exposed end of optical fiber 200 at span 206. In one embodiment, gap 150 is approximately 5 microns. The ends of optical fibers 200 opposite span 206 can be terminated or connected to other fibers and/or endpoints by other appropriate techniques.

Figure 7:
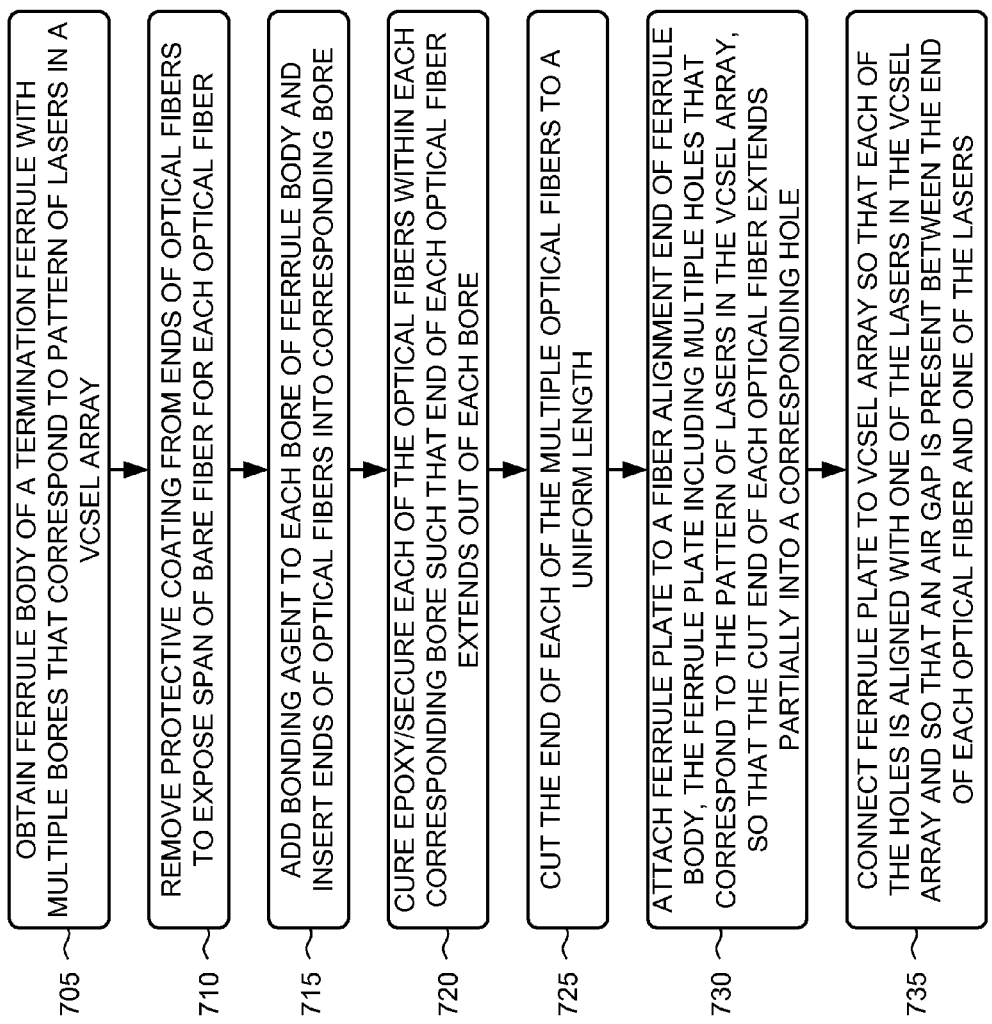
FIG. 7 is a flow chart of a process for using a termination ferrule to attach optical fibers to a VCSEL array according to an implementation described herein.

FIG. 7 is a flow chart of a process for using a termination ferrule to attach optical fibers to a VCSEL array according to an implementation described herein. FIGS. 8A-8E are schematic side cross-sectional views of simplified portions 800 of fiber termination assembly 10 in steps of process 700. Although described below primarily in the context of portions 800, process 700 may be applicable to any of the alignment components described above.

Process 700 may include obtaining a ferrule body of a termination ferrule with multiple bores that correspond to a pattern of lasers in a VCSEL array (block 705). For example, a ferrule body 110 may be provided that includes a number of bores 130 that match the pattern and number of VCSEL lasers 310 in VCSEL array 300.

Process 700 may also include, for each of multiple optical fibers, removing a protective coating from an end of the fiber to expose a span of bare fiber (block 710). For example, as shown in FIG. 3, optical fiber 200 may have protective coating 202 removed (e.g., stripped) from an end of the optical fiber 200 to expose a span 206 of bare fiber 204 prior to being used with fiber termination assembly 10. Each loose optical fiber 200 may be stripped, for example, for a sufficient length (e.g., one inch or more) to have the stripped portion (e.g., span 206) extend through ferrule body 110 and alignment end 114 to permit for cleaving of optical fibers 200 outside of ferrule body 110.

Process 700 may further include, adding a bonding agent to each bore of the ferrule body and inserting an end of the optical fiber into a corresponding bore (block 715) and securing the optical fiber within the corresponding bore, such that the end the optical fiber extends out of the corresponding bore (block 720). For example, as shown in FIG. 8A, each of fibers 200 may be inserted into a corresponding bore 130 of ferrule body 110. In one implementation, epoxy 805 or another bonding agent may be inserted into each bore 130 at fiber insertion end 112 before fiber 200 is inserted. As shown in FIG. 8B, each of fibers 200 may be prepared such that span 206 is long enough to extend at least a minimal distance 810 past fiber alignment end 114 of ferrule body 110 when fiber 200 is inserted into bore 130 and protective coating 202 abuts against shoulder 136. In one implementation, epoxy or glue may cure to secure each fiber 200 axially centered within each bore 130. In another implementation, clamps or other mechanical devices/techniques may be used to secure fibers 200 in place at fiber insertion end 112.

Process 700 may additionally include cutting the end of each of the multiple optical fibers to a uniform length (block 725). For example, after insertion in each bore 130 past fiber alignment end 114, the ends of fibers 200 may be cut to a uniform length past fiber alignment end 114, such as a length consistent with minimal distance 810. In one implementation, as shown in FIG. 8C, the exposed portions of multiple fibers 200 (e.g., spans 206) may be cut simultaneously using a laser 820 or another precision cutting process. In another implementation, the cut ends of fibers 200 may be polished, plasma treated, and/or otherwise treated. According to an embodiment, the cut ends of fiber 200 may be cut/polished with an accuracy of approximately between 1 to 3 microns.

Process 700 may further include attaching a ferrule plate of the termination ferrule to a fiber alignment end of the ferrule body, the ferrule plate including multiple holes that correspond to the pattern of lasers in the VCSEL array, so that the cut end of each of the multiple optical fibers extends partially into a corresponding hole of the multiple holes (block 730). For example, as shown in FIGS. 8D and 8E, ferrule plate 120 may be attached to fiber alignment end 114 of ferrule body 110. Holes 140 may align with bores 130 so that each of previously exposed portions of spans 206 are inserted partially into a corresponding hole 140. In one implementation, the larger diameter of holes 140—compared to the diameter of bore 130 at fiber alignment end 114—provides additional clearance to accommodate minor imperfections in the alignment of holes 140 with bores 130. Ferrule plate 120 may be attached to ferrule body 110 using glue, screws, clamps, clips, etc. In one implementation, as shown in FIGS. 8E and 8F, one or more alignment holes 830 may be drilled/added to ferrule plate 120 and ferrule body 110 after holes 140 and bores 130 are aligned and portions of spans 206 are inserted partially into corresponding holes 140. Alignment holes 830 may include one or more threaded holes to receive one or more screws 832 to secure ferrule plate 120 to ferrule body 110. In another implementation, one or more pins, rings, clips, latches or other mechanical attachment mechanisms (not shown) may be used to secure ferrule plate 120 and ferrule body 110 around the circumference of ferrule plate 120 and ferrule body 110.

Process 700 may also include connecting the ferrule plate to the VCSEL array so that each of the holes is aligned with one of the lasers in the VCSEL array and so that an air gap is present between the end of each of the multiple optical fibers and one of the lasers (block 735). For example, as shown in FIG. 8F, ferrule plate 120 may be secured to VCSEL array 300 with holes 140 aligned with VCSEL lasers 310, such that each VCSEL laser 310 projects light into a corresponding hole 140. In one implementation, the larger diameter of holes 140—compared to the diameter of bare fiber 204 at span 206—provides additional clearance to accommodate minor imperfections in the alignment of holes 140 with VCSEL lasers 310. The partial insertion of the exposed end of optical fiber 200 at span 206 creates a gap 150 between each VCSEL laser 310 and the exposed end of optical fiber 200. When activated, light from VCSEL lasers 310 is emitted into each corresponding hole 140 and conducted through optical fiber 200. The surface of ferrule plate 120 in contact with VCSEL array 300 keeps light from each VCSEL laser 310 within a respective hole 140 and prevents crosstalk between VCSEL lasers 310. In one aspect, the configuration of fiber termination assembly 10 can prevent inter-laser interference even if minor gaps/imperfections are present at the interfaces of ferrule plate 120/ferrule body 110 or ferrule plate 120/VCSEL array 300. The combination of air gap 150 with the polished side of hole 140 provide for efficient light transfer (from each VCSEL laser 310 to a corresponding fiber 200) that can more readily accommodate minor imperfections in alignment than, for example, physical contact of fiber 200 and VCSEL laser 310.

As described above, systems and methods may provide a termination ferrule that includes a ferrule body and a ferrule plate. The ferrule body may include multiple bores arranged to align with a pattern of lasers in a vertical-cavity surface-emitting laser (VCSEL) array. Each of the multiple bores may include an entry diameter sized to receive an optical fiber with a protective coating and an exit diameter sized to receive a portion of the optical fiber without the protective coating. The ferrule plate may include multiple holes arranged to align with the pattern of lasers in the VCSEL array. Each of the multiple holes may include a hole diameter sized to receive the portion of the optical fiber without the protective coating. The ferrule plate may be secured between the VCSEL array and the ferrule body, and the ferrule plate may isolate light from each laser within a hole and provide a thickness sufficient to create a gap between each laser in the VCSEL array and the corresponding optical fiber.

The systems and methods described herein may simplify termination and alignment of optical fibers to a VCSEL array, especially for larger scale arrays with, for example, more than 20 VCSEL lasers. Each laser in the VCSEL array can be isolated to prevent crosstalk. Cutting and/or polishing ends of the optical fibers prior to installation of a ferrule plate simplifies preparation and results in an effectively undercut fiber within the termination ferrule. Light from each VCSEL laser is efficiently directed through the polished holes in the ferrule plate to a corresponding optical fiber. The use of additional lenses for each VCSEL laser can be eliminated.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, in another implementation, ferrule body 110 and ferrule plate 120 may include indexing grooves/protrusions to simplify alignment of bores 130 with holes 140. In another implementation, ferrule body 110 and ferrule plate 120 may have different cross-sectional shapes from each other (although the pattern of bores 130 and holes 140 may be consistent with each other). In still another implementation, ferrule body 110 and/or ferrule plate 120 may include additional material, fittings, etc. to enable attachment to each other and VCSEL array 300. Also, while series of blocks have been described with respect to FIG. 7, the order of the blocks may be modified in other implementations. Further, non-dependent blocks may be performed in parallel.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A termination ferrule, comprising:
   a ferrule body including a plurality of bores extending from a fiber insertion end to a fiber alignment end of the ferrule body, the plurality of bores arranged to align with a pattern of lasers in a vertical-cavity surface-emitting laser (VCSEL) array,
       wherein each of the plurality of bores includes an entry diameter at the fiber insertion end sized for an optical fiber with a protective coating, an exit diameter at the fiber alignment end sized for a portion of the optical fiber without the protective coating, and a shoulder portion between the fiber insertion end to the fiber alignment end, and
       wherein each of the plurality of bores receives an optical fiber secured therein such that an end of the portion of the optical fiber without the protective coating extends past the fiber alignment end; and
   a ferrule plate including a plurality of holes, the plurality of holes arranged to align with the pattern of lasers in the VCSEL array, wherein a surface of each of the plurality of holes is polished,
       wherein each of the plurality of holes receives the end of the portion of the optical fiber that extends past the fiber alignment end,
       wherein the ferrule plate is secured between the VCSEL array and the ferrule body, and
       wherein the ferrule plate includes a thickness sufficient to create an air gap, along a hole axis and within the polished surface, between each laser in the VCSEL array and a corresponding end of the portion of the optical fiber.

2. The termination ferrule of claim 1, wherein the ferrule plate prevents crosstalk between the lasers in the VCSEL array when the ferrule plate is secured to the VCSEL array.

3. The termination ferrule of claim 1, the ferrule body including at least 20 bores.

4. The termination ferrule of claim 1, wherein the exit diameter is configured to receive a 125 micron diameter bare fiber.

5. The termination ferrule of claim 4, wherein the entry diameter is configured to receive a 250 micron diameter coated fiber.

6. The termination ferrule of claim 1, wherein a hole diameter of each of the plurality of holes is larger than the exit diameter and smaller than a diameter of the plurality of lasers in the VCSEL array.

7. The termination ferrule of claim 1, the ferrule body further comprising a ceramic material or a titanium material.

8. The termination ferrule of claim 1, the ferrule plate further comprising a ceramic material or a titanium material that is different than the material of the ferrule body.

9. The termination ferrule of claim 1, wherein the ferrule plate is secured to the ferrule body by one or more screws, pins, rings, clips or latches.

10. A method, comprising:
    obtaining a ferrule body of a termination ferrule with multiple bores extending from a fiber insertion end to a fiber alignment end of the ferrule body, the multiple bores corresponding to a pattern of lasers in a vertical-cavity surface-emitting laser (VCSEL) array, wherein each of the multiple bores includes an entry diameter at the fiber insertion end sized for an optical fiber with a protective coating, an exit diameter at the fiber alignment end, sized for a portion of the optical fiber without the protective coating, and a shoulder portion between the fiber insertion end to the fiber alignment end;
    removing the protective coating from an end of each of multiple optical fibers to expose a span of bare fiber for each of the multiple optical fibers;
    inserting the end of each of the multiple optical fibers through a corresponding bore of the ferrule body;
    securing each of the multiple optical fibers within each corresponding bore such that the end of the bare fiber of each of the multiple optical fibers extends out of each corresponding bore at the fiber alignment end of the ferrule body;
    cutting the end of the bare fiber of each of the multiple optical fibers to a uniform length, such that the end of the bare fiber extends past the fiber alignment end;
    attaching a ferrule plate of the termination ferrule to the fiber alignment end of the ferrule body, the ferrule plate including multiple holes that correspond to the pattern of lasers in the VCSEL array, wherein a surface of each of the multiple holes is polished, and wherein each of the multiple holes receives one of the ends of the bare fiber that extends past the fiber alignment end; and
    connecting the ferrule plate to the VCSEL array so that each of the multiple holes is aligned with one of the lasers in the VCSEL array and so that an air gap, along a hole axis and within the polished surface, is present between the end of the bare fiber of each of the multiple optical fibers and one of the lasers.

11. The method of claim 10, the cutting further comprising using a laser cutting technique to cut the end of the bare fiber of each of the multiple optical fibers while the end of the bare fiber extends out of the ferrule body.

12. The method of claim 10, the attaching further comprising inserting each of the multiple optical fibers into a corresponding hole of the multiple holes, so that the cut end of the bare fiber extends partially into the corresponding hole of the multiple holes.

13. The method of claim 10, the connecting further comprising:
attaching the ferrule body to the VCSEL array with the ferrule plate secured between the ferrule body and the VCSEL array.

14. The method of claim 10, the connecting further comprising:
bringing the ferrule plate into contact with the VCSEL array so that light from each laser in the VCSEL array is isolated in a single hole of the ferrule plate.

15. The method of claim 10, the removing including:
stripping a coating from each of the multiple optical fibers for a sufficient length to extend the bare fiber of the optical fibers through the ferrule body.

16. A fiber termination assembly, comprising:
a vertical-cavity surface-emitting laser (VCSEL) array including multiple lasers in a particular two-dimensional array pattern;
multiple optical fibers, a number of the multiple optical fibers corresponding to a number of the multiple lasers;
a ferrule body including a plurality of bores extending from a fiber insertion end to a fiber alignment end of the ferrule body, the plurality of bores arranged to correspond to the particular two-dimensional array pattern,
wherein each of the plurality of bores includes an entry diameter at the fiber insertion end sized for an optical fiber with a protective coating, an exit diameter at the fiber alignment end sized for a portion of the optical fiber without the protective coating, and a shoulder portion between the fiber insertion end to the fiber alignment end, and
wherein each of the plurality of bores receives an optical fiber secured therein such that an end of the portion of the optical fiber without the protective coating extends past the fiber alignment end; and
a ferrule plate including a plurality of polished holes, the plurality of polished holes arranged to align with the particular two-dimensional array pattern,
wherein each of the plurality of polished holes receives the end of the portion of the optical fiber that extends past the fiber alignment end,
wherein the ferrule plate is secured between the VCSEL array and the ferrule body, and
wherein the ferrule plate includes a thickness sufficient to create an air gap, along a hole axis and within each of the plurality the polished holes, between each laser in the VCSEL array and the corresponding end of the portion of the optical fiber.

17. The fiber termination assembly of claim 16, wherein the ferrule plate prevents crosstalk between the multiple lasers in the VCSEL array when the ferrule plate is secured to the VCSEL array.

18. The fiber termination assembly of claim 16, wherein each of the hole diameters of the ferrule plate is larger than each of the exit diameters of the ferrule body.

* * * * *